US010599446B2

(12) United States Patent
Tolstoy et al.

(10) Patent No.: US 10,599,446 B2
(45) Date of Patent: Mar. 24, 2020

(54) MECHANISM FOR TRANSPARENT VIRTUAL TAPE ENGINES RESTART

(71) Applicant: EMC IP Holding Company LLC, Hopkinton, MA (US)

(72) Inventors: Mikhail Tolstoy, Saint Petersburg (RU); Yuri Kotov, Saint Petersburg (RU); Dmitry Ashkadov, Saint Petersburg (RU); Mikhail Saravayskiy, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 15/981,170

(22) Filed: May 16, 2018

(65) Prior Publication Data

US 2019/0129726 A1    May 2, 2019

(30) Foreign Application Priority Data

Oct. 31, 2017  (RU) ................................ 2017137964

(51) Int. Cl.
| G06F 11/14 | (2006.01) |
| G06F 9/4401 | (2018.01) |
| G11B 5/008 | (2006.01) |
| G11B 15/02 | (2006.01) |
| G06F 3/06 | (2006.01) |
| G06F 9/455 | (2018.01) |
| G06F 11/00 | (2006.01) |

(52) U.S. Cl.
CPC .......... *G06F 9/4416* (2013.01); *G06F 3/0617* (2013.01); *G06F 3/0634* (2013.01); *G06F 3/0656* (2013.01); *G06F 3/0664* (2013.01); *G06F 3/0682* (2013.01); *G06F 9/45533* (2013.01); *G06F 11/00* (2013.01); *G11B 5/00813* (2013.01); *G11B 15/026* (2013.01)

(58) Field of Classification Search
CPC .......................... G06F 3/0664; G06F 11/1438
See application file for complete search history.

(56) References Cited

U.S. PATENT DOCUMENTS

| 7,162,604 B1 | 1/2007 | Nourmohamadian et al. |
| 7,302,540 B1 | 11/2007 | Holdman |
| 7,620,765 B1 | 11/2009 | Ohr et al. |
| 8,291,183 B2 | 10/2012 | McCloskey et al. |
| 8,458,422 B1 | 6/2013 | Holdman et al. |
| 8,667,239 B1 | 3/2014 | McCloskey et al. |
| 8,775,756 B1 | 7/2014 | McCloskey et al. |
| 8,793,452 B1 | 7/2014 | McCloskey et al. |
| 8,924,682 B1 | 12/2014 | McCloskey et al. |
| 9,009,443 B2 | 4/2015 | Haustein et al. |
| 9,207,877 B1 | 12/2015 | McCloskey |
| 9,436,591 B1 | 9/2016 | McCloskey et al. |
| 9,471,233 B1 | 10/2016 | Goodwin-Jette et al. |
| 9,552,370 B1 | 1/2017 | McCloskey et al. |
| 9,582,207 B1 | 2/2017 | McCloskey |

(Continued)

*Primary Examiner* — Albert Wang

(74) *Attorney, Agent, or Firm* — Chamberlain, Hrdlicka, White, Williams & Aughtry

(57) ABSTRACT

A mechanism for transparent (or non-disruptive) virtual tape engines restart. Specifically, the disclosed mechanism entails preserving a pre-restart state prior to restarting a virtual tape engine, followed by restoring the pre-restart state after the restarting in order to achieve transparency.

20 Claims, 10 Drawing Sheets

(56) References Cited

U.S. PATENT DOCUMENTS

| | | | |
|---|---|---|---|
| 10,126,969 | B1 | 11/2018 | Tolstoy et al. |
| 2004/0034811 | A1 | 2/2004 | Trimmer |
| 2005/0033911 | A1 | 2/2005 | Kitamura |
| 2006/0123208 | A1 | 6/2006 | Johnson |
| 2007/0103984 | A1 | 5/2007 | Kavuri |
| 2008/0162813 | A1 | 7/2008 | Haustein et al. |
| 2008/0222344 | A1 | 9/2008 | Upadhyayula |
| 2008/0301363 | A1 | 12/2008 | Kitamura |
| 2010/0086135 | A1 | 4/2010 | Wideman |
| 2010/0185813 | A1 | 7/2010 | Muroyanna |
| 2012/0198146 | A1 | 8/2012 | Hostetter et al. |
| 2012/0284555 | A1 | 11/2012 | Akirav et al. |
| 2014/0136892 | A1* | 5/2014 | Wu ........................ G06F 3/061 714/15 |
| 2014/0355148 | A1* | 12/2014 | Ralphs .................. G06F 3/0653 360/31 |
| 2015/0154085 | A1 | 6/2015 | Iwasaki et al. |

\* cited by examiner

MECHANISM FOR TRANSPARENT VIRTUAL TAPE ENGINES RESTART

BACKGROUND

The restarting of a virtual tape server to fulfill updates, reconfigurations, or disaster recovery operations is presently a disruptive process to any connecting mainframe.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid necessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a mechanism for transparent (or non-disruptive) virtual tape engines restart. Specifically, one or more embodiments of the invention entails preserving a pre-restart state prior to restarting a virtual tape engine, followed by restoring the pre-restart state after the restarting in order to achieve transparency.

Figure 1:
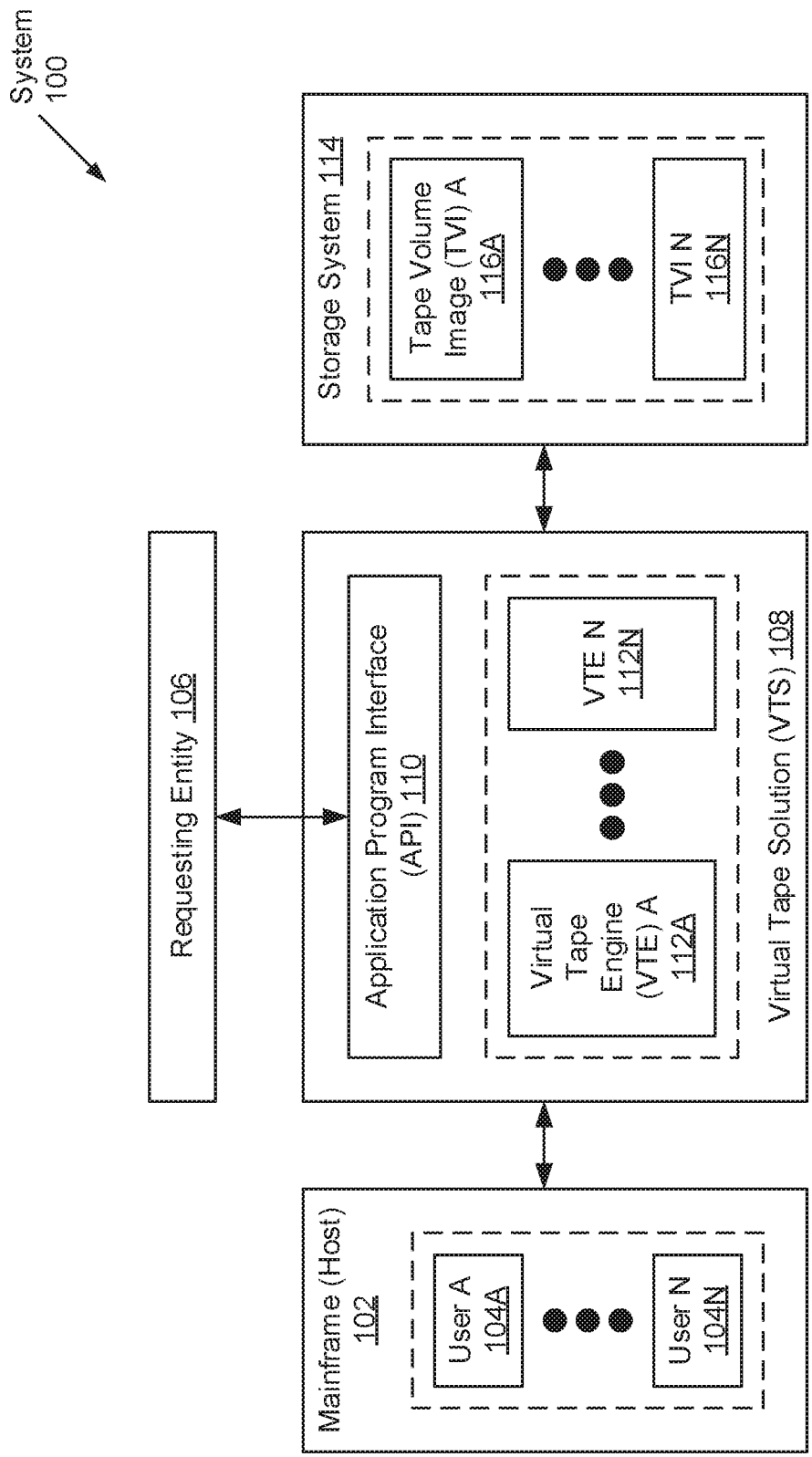
FIG. 1 shows a system in accordance with one or more embodiments of the invention.

FIG. 1 shows a system in accordance with one or more embodiments of the invention. The system (100) includes a virtual tape solution (VTS) (108) operatively connected to a mainframe (102), a requesting entity (106), and a storage system (114). Each of these components is described below.

In one embodiment of the invention, the aforementioned components may be directly or indirectly connected to each other using any combination of wired or wireless connections. In embodiments in which the aforementioned components are indirectly connected to one another, there may be other network infrastructure components or systems (e.g., switches, routers, gateways, servers, etc.) (not shown) that facilitate communication between the aforementioned components. Moreover, the aforementioned components may communicate with each other using any combination of wired and/or wireless communication protocols.

In one embodiment of the invention, the VTS (108) may be a disk-based. data backup and archiving platform for the mainframe (102). The VTS (108) may include an application program interface (API) (110) and a set of one or more virtual tape engines (VTEs) (112A-112N). In one embodiment of the invention, the API (110) may provide a specification for the exchange of information between the VTS (108) and the requesting entity (106), or the VTS (108) and the mainframe (102). For example, the API (110) may establish that the exchange of information entails a request for processing and a return of a response based on the outcome of the processing. In one embodiment of the invention, the API (110) may include logic dedicated towards the delegation of received requests to an appropriate VTE (112A-112N). To that end, the API (110) may include functionality to search and update locally-stored data structures (not shown), which may be used to store/map which VTE (112A-112N) is emulating which tape drive (see e.g., FIG. 2). Further, the API (110) may be implemented using hardware, software, firmware, or any combination thereof. By way of an example, the API (110) may be a web API accessed through a wide area network (WAN) (e.g., Internet) connection.

In one embodiment of the invention, a VTE (112A-112N) may be a server on which one or more tape drives (described below) may be emulated. Specifically, a VTE (112A-112N) may be a physical computing system programmed to: (i) receive and process requests concerning tape drives; (ii) add, remove, or re-configure one or more tape drives based on the requests; and (iii) generate and send responses to the requests based on the outcome of their processing. VTEs (112A-112N) are described in further detail below with respect to FIG. 2.

In one embodiment of the invention, the mainframe (102) may be any computing system (see e.g., FIG. 6) used for various applications. These applications may, for example, require large-scale and complex data processing. Further, the mainframe (102) may be any computing system that may serve multiple users (104A-104N) concurrently. The mainframe (102) may be programmed to provide and manage the allocation of computing resources for use by the various executing processes (e.g., tasks) instantiated by the one or more users (104A-104N). Further, the mainframe (102) may include functionality to submit input/output (I/O) requests to the VTS (108). The I/O requests may include, but are not limited to, requests to write data to a virtual tape drive (not shown), and requests to read data from the virtual tape drive.

In one embodiment of the invention, the requesting entity (106) may be any type of computing system (see e.g., FIG. 6) programmed to interact with the VTS (108). Specifically, the requesting entity (106) may include functionality to: (i) submit requests concerning one or more tape drives to the VTS (108); (ii) submit requests pertaining to the restarting of one or more VTEs (112A-112N) to the VTS (108); and (iii) receive responses, from the VTS (108), based on the outcome of the processing of the requests. By way of examples, the requesting entity (106) may be a desktop computer, a laptop computer, a smartphone, or a table computer operated by a network, datacenter, and/or mainframe administrator.

In one embodiment of the invention, the storage system (114) may be a back-end data repository implemented using any type of storage unit and/or device (e.g., a file system, database, collection of tables, or any other storage mechanism). The storage system (114) may be implemented using multiple storage units and/or devices, which may or may not be of the same type or located at the same physical site. In one embodiment of the invention, the storage system (114) includes functionality to store one or more tape volume images (TVIs) (116A-116N). A TVI (116A-116N) may represent, for example, a single file in a file system, or a single record in a database. Further, each TVI (116A-116N) may cache short-retention data and/or consolidate long-retention data used and/or generated by the various processes (e.g., tasks) which may be executing on the mainframe (102). In one embodiment of the invention, the storage system (114) may include functionality to manipulate the storage of the TVIs (116A-116N) by way of providing, for example, the deduplication, compression, encryption, etc., of data. In one embodiment of the invention, the storage system (114) includes persistent storage (not shown). Examples of persistent storage hosted on the storage system (114) include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), and any other memory defined as a non-volatile Storage Class Memory (SCM).

While FIG. 1 shows a configuration of components, other system configurations may be used without departing from the scope of the invention. For example, embodiments of the invention may be implemented using multiple instances of each component. Specifically, one set of components (including at least a mainframe (102), a VTS (108), and a storage system (114)) may function as a primary system, whereas another set of components may function as a secondary or backup system activated once the primary system experiences failover.

Figure 2:
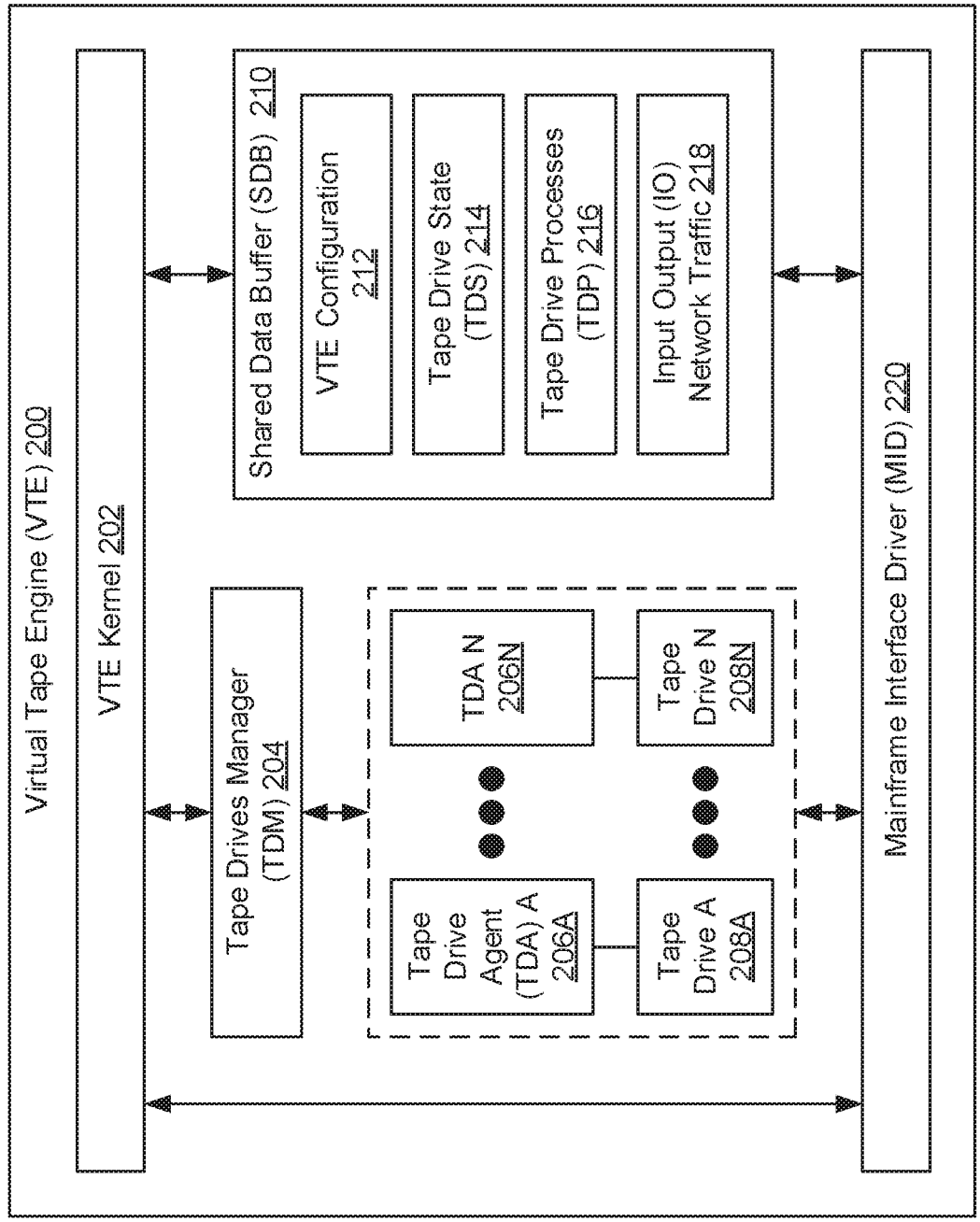
FIG. 2 shows a virtual tape engine in accordance with one or more embodiments of the invention.

FIG. 2 shows a virtual tape engine (VTE) in accordance with one or more embodiments of the invention. The VTE (200) includes a VTE kernel (202) operatively connected to a tape drives manager (TDM) (204), a shared data buffer (SDB) (210), and a mainframe interface driver (MID) (220). The TDM (204) may be operatively connected and responsible for one or more tape drive agents (TDAs) (206A-206N). Each TDA (206A-206N) may be operatively connected and responsible for one and only one emulated tape drive (208A-208N). Each of these components is described below.

In one embodiment of the invention, the VTE kernel (202) may be a computer program executing on the VTE (200). The VTE kernel (202) includes functionality to: (i) receive and interpret requests relayed by the VTS API (see e.g., FIG. 1) from a requesting entity; (ii) access the SDB (210) to store and retrieve information consolidated therein; (iii) issue detach and attach requests (described below) to the MID (220); (iv) restart the VTE (200) due to, for example, the performing of update, reconfiguration, or data recovery operations; (v) issue addition requests (described below) to the TDM (204); (vi) issue request reports (described below) to the VTS API; and (vii) receive addition responses (described below) from the TDM (204).

In one embodiment of the invention, the TDM (204) may be a computer process (or an instance of a computer program) executing on the VTE (200). Specifically, the TDM (204) may be a computer process dedicated towards the management of one or more TDAs (206A-206N) which may be executing on the VTE (200). With respect to TDA management, the TDM (204) includes functionality to: (i) create and delete TDAs (206A-206N); (ii) create tape drives (208A-208N); (iii) assign TDAs (206A-206N) to tape drives (208A-208N); (iv) receive requests concerning the configuration (e.g., addition, removal, or modification) of one or more tape drives (208A-208N) which may be submitted by the VTE kernel (202); and (v) generate and provide responses, outlining the outcomes of the processed requests, to the VTE kernel (202).

In one embodiment of the invention, a TDA (206A-206N) may be a computer process (or an instance of a computer program) executing on the VTE (200). Specifically, a TDA (206A-206N) may be a computer process dedicated towards the management of one of the one or more tape drives (208A-208N) emulated on the VTE (200). With respect to tape drive management, a TDA (206A-206N) includes functionality to: (i) manage the life cycle of their respectively managed tape drive (208A-208N); (ii) ready their respectively managed tape drive (208A-208N) for deletion, when commanded, by (a) cleaning up their respectively managed tape drive (208A-208N) and (b) setting a current usage state of their respectively managed tape drive (208A-208N) to a dead state after the cleaning up; and (iii) update the management information (i.e., at least a portion of a tape drive configuration (TDC)) associated with their respectively managed tape drive (208A-208N).

In one embodiment of the invention, a TDC may include, but is not limited to: (i) a tape library: ID associated with a virtual tape library (not shown) to which the virtual tape drive points accesses); (ii) a media access control (MAC) address and/or Internet Protocol (IP) address assigned to the virtual tape drive; (iii) drive type information detailing the specifications for the physical tape drive model the virtual tape drive is to be emulating; (iv) a set of parameters defining the behavior of the virtual tape drive; and (v) a mount point or directory within the VTE filesystem to which the virtual tape drive may logically attach. Further, in one embodiment of the invention, cleaning up a managed tape drive (208A-208N) may include, but is not limited to, the execution of the following processes: (i) the freeing up (or deallocation) of memory allocated to the managed tape drive (208A-208N); (ii) the refreshing of a tape library references counter; and (iii) the dumping of statistics related to the managed tape drive (208A-208N).

In one embodiment of the invention, a tape drive (208A-208N) may be an emulation of physical tape hardware. Accordingly, a tape drive (208A-208N) may be a software construct (e.g., a virtual machine) that implements physical tape drive functionality. Physical tape drive functionality may include, but is not limited to, the reading and writing of data used and/or generated by the mainframe from/to the storage system (see e.g., FIG. 1).

In one embodiment of the invention, the SDB (210) may be a data repository implemented using any type of storage unit and/or device (e.g., a file system, database, collection of tables, or any other storage mechanism). The SDB (210) may be implemented using multiple storage units and/or devices, which may or may not be of the same type: In one embodiment of the invention, the SDB (210) may be implemented using persistent storage. Examples of persistent storage hosted on the SDB (210) include, but are not limited to, optical storage, magnetic storage, NAND Flash Memory, NOR Flash Memory, M-RAM, ST-MRAM, PCM, and any other memory defined as a non-volatile SCM.

In one embodiment of the invention, the SDB (210) may include functionality to store and organize various information. The various information may include, but is not limited to including, VTE configurations (212), tape drive states (TDSs) (214), tape drive processes (TDPs) (216), and I/O network traffic (218). Each of these data items are described below.

In one embodiment of the invention, a VTE configuration (212) may be a set of parameters and/or instructions for configuring a VTE (200). Further, in one embodiment of the invention, a VTE configuration may outline an initial state to which a VTE (200) may be configured upon creation, reconfiguration, or re-initialization of the VTE (200). A VTE configuration (212) may specify, but is not limited to specifying: (i) the number of tapes drives (208A-208N) to emulate; (ii) an initial or default state with which to configure the one or more emulated tape drives (208A-208N); (iii) the tape library storage configuration for the emulated tape drives (208A-208N); (iv) virtual tape properties that are available through the emulated tape drives (208A-208N); and (v) details describing various disaster recovery scenarios. Further, in one embodiment of the invention, the VTE configuration may further specify a restore from saved state (RSS) flag. The RSS flag may be a predefined data object (e.g., a bit or bit sequence) used to indicate, after restarting, whether the emulated tape drive(s) (208A-208N) on the VTE (200) should assume an initial state defined in the VTE configuration (212) or, alternatively, assume a previous state (i.e., a TDS (214)) stored prior to the restarting.

In one embodiment of the invention, the TDS (214) may be a current or most recent set of parameters (prior to the restarting of the VTE (200)) defining the state for each of one or more tape drives (208A-208N) emulated on the VTE (200). These set of parameters may be substantially similar to the information specified in a TDC (described above), and therefore, may include, but is not limited to including: (i) a tape library ID associated with a virtual tape library (not shown) to which the virtual tape drive points (i.e., accesses); (ii) a media access control (MAC) address and/or Internet Protocol (IP) address assigned to the virtual tape drive; (iii) drive type information detailing the specifications for the physical tape drive model the virtual tape drive is to be emulating; and (iv) a set of parameters defining the behavior of the virtual tape drive. In one embodiment of the invention, the TDS (214) may further specify the mount point or directory to which each of the one or more tape drives (208A-208N) are/were logically attached, and thus accessible through, within the VTE filesystem. Moreover, in one embodiment of the invention, the TDS (214) may further detail whether one or more tape drives (208A-208N) had been in the middle of I/O operations initiated by a requesting entity (not shown), the VTE (200), or the mainframe (not shown). If one or more tape drives (208A-208N) were indeed in middle of I/O operations, the subset of tape drives (208A-208N) in use are noted, as well as information pertaining to the operation(s) that were in progress and pointers to data blocks in the subset of tape drives (208A-208N) involved with those operation(s). In one embodiment of the invention, the TDS (214) may be stored in the SDB (210) in binary format so as to ease and speed up processing.

In one embodiment of the invention, the TDPs (216) may be a set of computer processes executing on the VTE (200) tasked with performing one or more operations that support the one or more tape drives (208A-208N). By way of an example, the TDPs (216) may include, but is not limited to including, the one or more TDAs (206A-206N) responsible for managing the one or more tape drives (208A-208N) emulated on the VTE (200). Examples of other supportive processes within the TDP (216) may include, but are not limited to, one or more processes that handle backup or recovery operations, intra-component communications, emulation or virtualization mechanisms, data compression operations, data encryption, data integrity validation, and data replication management. Further, in one embodiment of the invention, while stored in the SDB (210), the execution of the TDPs (216) throughout the VTE (200) may be suspended.

In one embodiment of the invention, I/O network traffic (218) may pertain to incoming and/or outgoing network packets stored within packet buffers (not shown) located on physical network interface hardware (not shown) associated with the VTE (200). The physical network interface hardware may, for example, relate to the fiber connectivity (FICON) channels hardware (not shown) on the VTE (200) that enables communication and/or data exchange between the mainframe and the VTE (200). In one embodiment of the invention, any incoming network traffic from the mainframe to the VTE (200) may include, but is not limited to, I/O requests, which may be representative of requests to write data to one or more tape drives (208A-208N), or requests to read data from one or more tape drives (208A-208N). Conversely, any outgoing network traffic from the VTE (200) to the mainframe may include, but is not limited to, notifications (e.g., busy notifications and ready notifications (described below)), sought data obtained from one or more tape drives (208A-208N) provided in response to the receiving of data reading I/O requests, etc. Furthermore, in one embodiment of the invention, the above-mentioned FICON channels hardware may be further disclosed herein as mainframe interfaces, which may be managed by the MID (220) (described below).

In one embodiment of the invention, a network packet may be a container or data structure for containing data that travels between systems (e.g., between the mainframe and the VTE (200)) over a network. Depending on the communication protocol used for the transmission of the data, a network packet may be referred to as, for example, a datagram, a segment, a block, a cell, or a frame. Examples of network packets include, but are not limited to, IP packets based on the IP protocol, Ethernet or MAC frames based on the Ethernet protocol, and user datagram protocol (UDP) packets based on the UDP.

In one embodiment of the invention, a packet buffer may be a memory space residing in physical network interface hardware (e.g., the mainframe interfaces). Further, a packet buffer may refer to memory space reserved for the temporary storage of: (i) outgoing network packets awaiting transmission over networks, or alternatively, (ii) incoming network packets received from over networks that may be awaiting processing.

In one embodiment of the invention, the MID (220) may be a computer program or a computer process (i.e., an instance of a computer program) executing on the VTE (200) that operates or controls the one or more mainframe interfaces (e.g., FICON channels) installed on the VTE (200). That is, the MID (220) may be an abstraction that serves as a translator between the physical network interface hardware and the one or more computer programs and processes (e.g., the VTE kernel (202)) residing on the VTE (200). Moreover, the MID (220) may include functionality to: (i) issue busy and ready notifications through the one or more mainframe interfaces to a mainframe; (ii) suspend TDPs (216) and I/O network traffic (218) by storing them in the SDB (210); (iii) receive detach and attach requests from the VTE kernel (202); (iv) release TDPs (216) and I/O network traffic (218) from suspension; (v) detach, attach, or re-attach one or more tape drives (208A-208N) from/to the one or more mainframe interfaces; and (vi) issue attach and detach responses (described below) to the VTE, kernel (202). One of ordinary skill will appreciate that the MID (220) may perform other functionalities without departing :from the scope of the invention.

While FIG. 2 shows a configuration of components, other VTE architectures may be used without departing from the scope of the invention. For example, in one or more embodiments of the invention, the VTE (200) may further include a tape library manager (TLM) (not shown) operatively connected to the VTE kernel (202), a set of tape library agents (TLAs) (not shown), and a set of tape libraries (not shown).

In one embodiment of the invention, the TLM may be a computer process (or an instance of a computer program) executing on the VTE (200). Specifically, the TLM may be a computer process dedicated towards the management of one or more TLAs which may also be executing on the VTE (200). With respect to TLA management, the TLM includes functionality to: (i) create and delete TLAs; (ii) create tape libraries; (iii) assign TLAs to tape libraries; (iv) receive requests concerning the configuration (e.g., addition, removal, or modification) of one or more tape libraries, which may be delegated from the VTE kernel (202); and (v) generate and provide request reports, outlining the outcomes of the processed requests, to the VTE kernel (202).

In one embodiment of the invention, a TLA may be a computer process (or an instance of a computer program) executing on the VTE (200). Specifically, a TLA may be a computer process dedicated towards the management of one of the one or more tape libraries defined on the VTE (200). With respect to tape library management, a TLA includes functionality to: (i) manage the life cycle of their respective tape library; (ii) remove/delete their respective tape library in response to a shutdown command; and (iii) update management information (i.e., at least a portion of library management information (LMI) (not shown)) associated with their respective tape library.

In one embodiment of the invention, LMI ray include, but is not limited to: (i) the storage location in the storage system (see e.g., FIG. 1) wherein TVIs forming the tape library resides; (ii) the mount point or directory in the VTE (200) wherein the tape library resides; (iii) the classification of the tape library as designated by a requesting entity; (iv) metadata associated with the tape library and/or the contents or data to which the tape library organizes; and (v) a configuration specifying the enablement or disablement of storage system features (e.g., deduplication, replication, encryption, compression, etc.) describing how data organized by the tape library would be stored.

In one embodiment of the invention, a tape library may be a single filesystem within which one or more TVIs (see e.g., FIG. 1) may be mounted. As a filesystem, a tape library may store identifiers and/or address locations in memory or non-transitory computer readable media (e.g., the storage system (see e.g., FIG. 1)) within which data (i.e., the TVIs) may be consolidated.

Figure 3A:
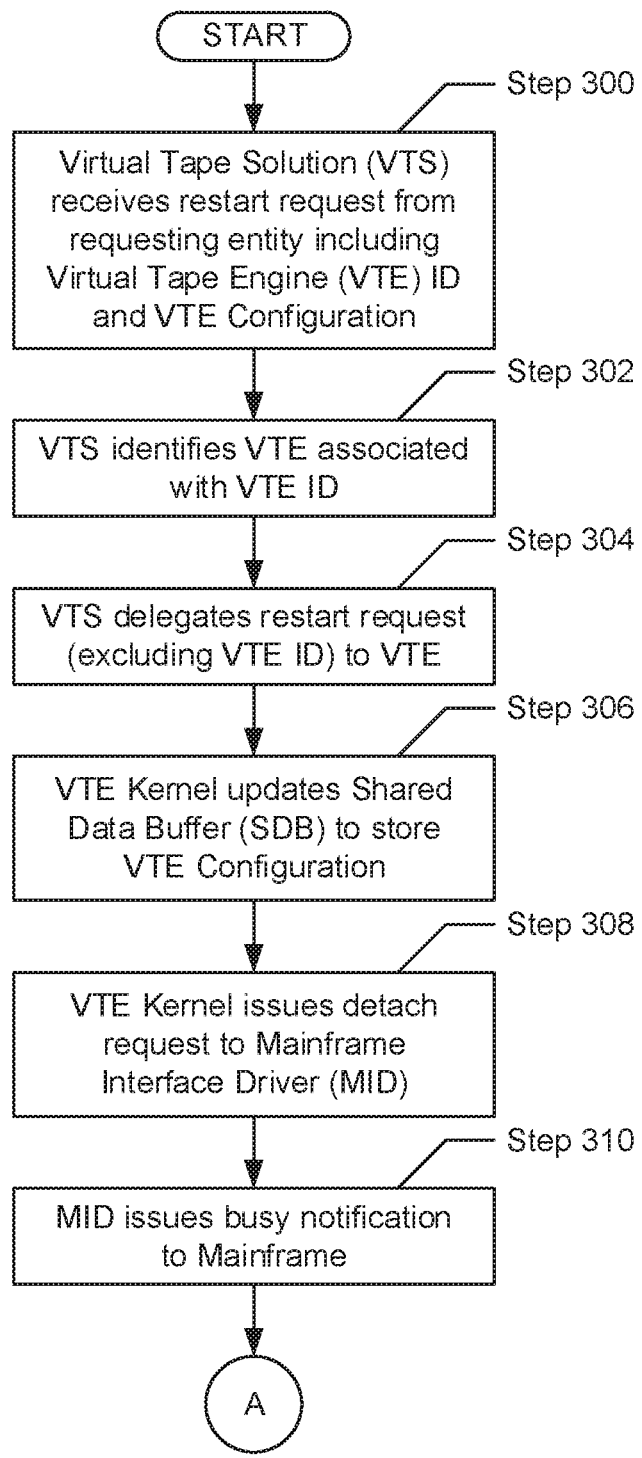
FIGS. 3A and 3B show flowcharts describing a method for configuring a virtual tape engine before undergoing a restart in accordance with one or more embodiments of the invention.
Figure 3B:
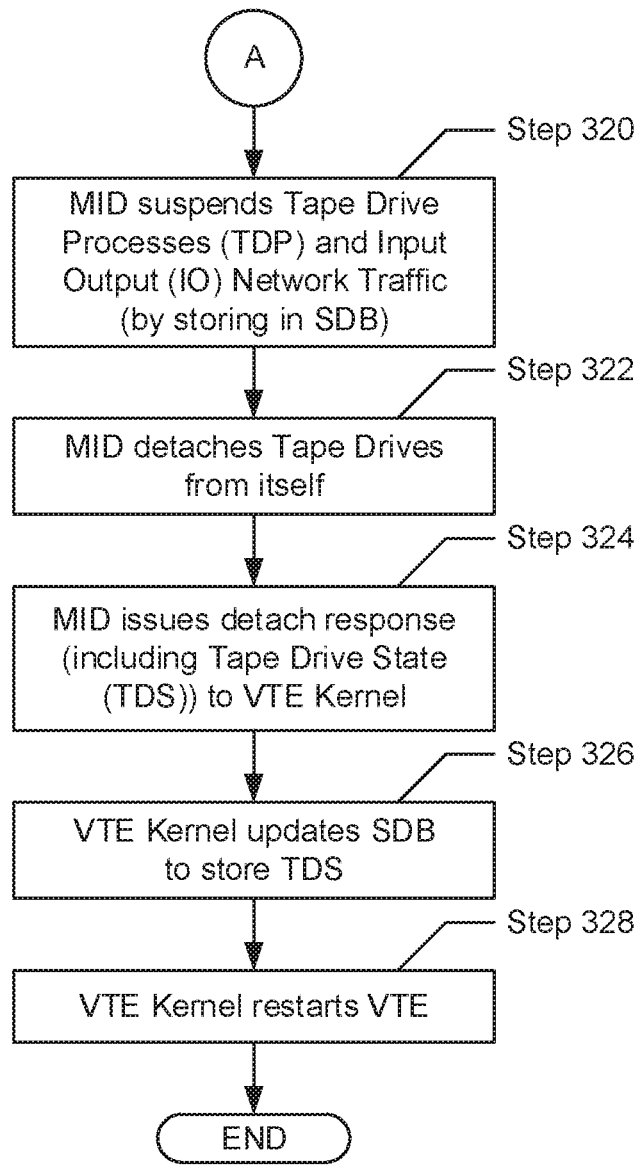

FIGS. 3A and 3B show flowcharts describing a method for configuring a virtual tape engine before undergoing a restart in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 3A and 3B may be performed in parallel with any other steps shown in FIGS. 4A-4D without departing from the scope of the invention.

Turning to FIG. 3A, in Step 300, the virtual tape solution (VTS), or more specifically, the VTS application program interface (API) receives a restart request from a requesting entity. In one embodiment of the invention, the restart request may pertain to the updating, reconfiguration, or failover recovery of one or more virtual tape engines (VTEs). Subsequently, the restart request may include one or more VTE IDs and one or more VTE configurations (described above, see e.g., FIG. 2).

In one embodiment of the invention, a VTE ID (not shown) may be a string of characters (e.g., letters, numbers, symbols, etc.) that is used to identify a VTE. The VTE ID may be automatically generated when a VTE is installed within the VTS, may be chosen or selected when the VTE is installed, and may be changed any time after the VTE is installed. In another embodiment of the invention, the VTE ID may be a unique identifier of the VTE, which distinguishes the VTE from other VTEs executing on the VTS. In such an embodiment, the VTE ID may be based on a unique identifier of the underlying host (e.g., the VTS) on which the VTE is executing. Further, in such an embodiment, the VTE ID may be rarely changed or modified for the life of the VTE. As such, the VTE ID may be of any length and may contain any combination of characters that allows a VTE to be uniquely identified. By way of an example, a VTE ID may be an alphanumeric tag given by an administrator, or may be a N-bit integer (where N>0) expressed in hexadecimal notation and generated by the VTS.

In Step 302, for each of the one or more VTE IDs received within the restart request (obtained in Step 300), the VTS identifies the VTE associated with the VTE ID. Thereafter, in Step 304, the VTS delegates a portion of the restart request to each identified VTE. In one embodiment of the invention, each portion of the restart request (directed to a respective identified VTE) may include one of the one or more VTE configurations (received in Step 300). Substantively, each identified VTE receives their respective VTE configuration.

In Step 306, a VTE kernel on an identified VTE receives their portion of the restart request (delegated by the VTS in Step 304). In one embodiment of the invention, the VTE kernel may then proceed to update the shared data buffer (SDB) residing on the VTE. Specifically, the VTE kernel may access the SDB to store their received VTE configuration therein.

In Step 308, after storing the VTE configuration, the VTE kernel issues (i.e., generates and transmits) a detach request to the mainframe interface driver (MID) (see e.g., FIG. 2). In one embodiment of the invention, the detach request may include instructions directing the MID to sever connectivity between the one or more tape drives being emulated on the VTE and the one or more mainframe interfaces (e.g., the physical FICON channels hardware).

In Step 310, in response to receiving the detach request (issued by the VTE kernel in Step 308), the MID issues a busy notification to the mainframe (with which the MID, and thus, the mainframe interface(s), may be operatively connected). In one embodiment of the invention, the busy notification may be a message forewarning the mainframe that the VTE is busy, and thereby, requesting the mainframe to suspend the submission of future tape drive write and/or read requests to the VTS/VTE. In one embodiment of the invention, the busy notification may be a feature provided in the FICON protocol specification.

Turning to FIG. 3B, in Step 320, following the issuance of the busy notification, the MID suspends one or more tape drive processes (TDPs). As described above, a TDP may be a computer process (i.e., an instance of a computer program) executing on the VTE that may be tasked with performing one or more operations that support the one or more tape drives. Further, suspension of the one or more TDPs may entail halting and subsequently preserving/storing the TDPs, including their respective program codes and their respective current activities, in the SDB. In one embodiment of the invention, following the issuance of the busy notification, the MID may further suspend the I/O network traffic temporarily stored in packet buffers located on the one or more mainframe interfaces. Similar to the suspension of TDPs, the suspension of the I/O network traffic may entail the preservation or storage of the I/O network traffic (consisting of incoming and outgoing network packets) within the SDB.

In Step 322, the MID then detaches the tape drive(s) being emulated on the VTE from itself, and subsequently, the mainframe interface(s). In one embodiment of the invention, detaching a tape drive may refer to the unmounting of the tape drive, thereby rendering the tape drive and the data to which the tape drive points in a storage system inaccessible. While or following the detachment of each tape drive, the MID may further obtain tape drive state (TDS) (described above) associated with each tape drive. Substantively, the MID may obtain the current or most recent set of parameters defining the state for each tape drive at the time of detachment.

In Step 324, the MID issues a detach response to the VTE kernel. In one embodiment of the invention, the detach response may include the TDS for each tape drive (obtained in Step 322). Further, the detach response may be a reply to the detach request issued by the VTE kernel to the MID earlier (see e.g., Step 308). In Step 326, upon receiving the TDS for the tape drive(s) from the MID, the VTE kernel updates the SDB residing on the VTE. Specifically, in one embodiment of the invention, the VTE kernel may access the SDB to store the received TDS for the tape drive(s) therein. Finally, in Step 328, after updating the SDB, the VTE kernel restarts the VTE. In one embodiment of the invention, restarting of the VTE may, in part, support the application of an update, reconfiguration, or disaster recovery operation on the VTE.

FIGS. 4A-4D show flowcharts describing a method for configuring a virtual tape engine after undergoing a restart in accordance with one or more embodiments of the invention. While the various steps in the flowcharts are presented and described sequentially, one of ordinary skill will appreciate that some or all steps may be executed in different orders, may be combined or omitted, and sonic or all steps may be executed in parallel. In one embodiment of the invention, the steps shown in FIGS. 4A-4D may be performed in parallel with any other steps shown in FIGS. 3A and 3B without departing from the scope of the invention.

Figure 4A:
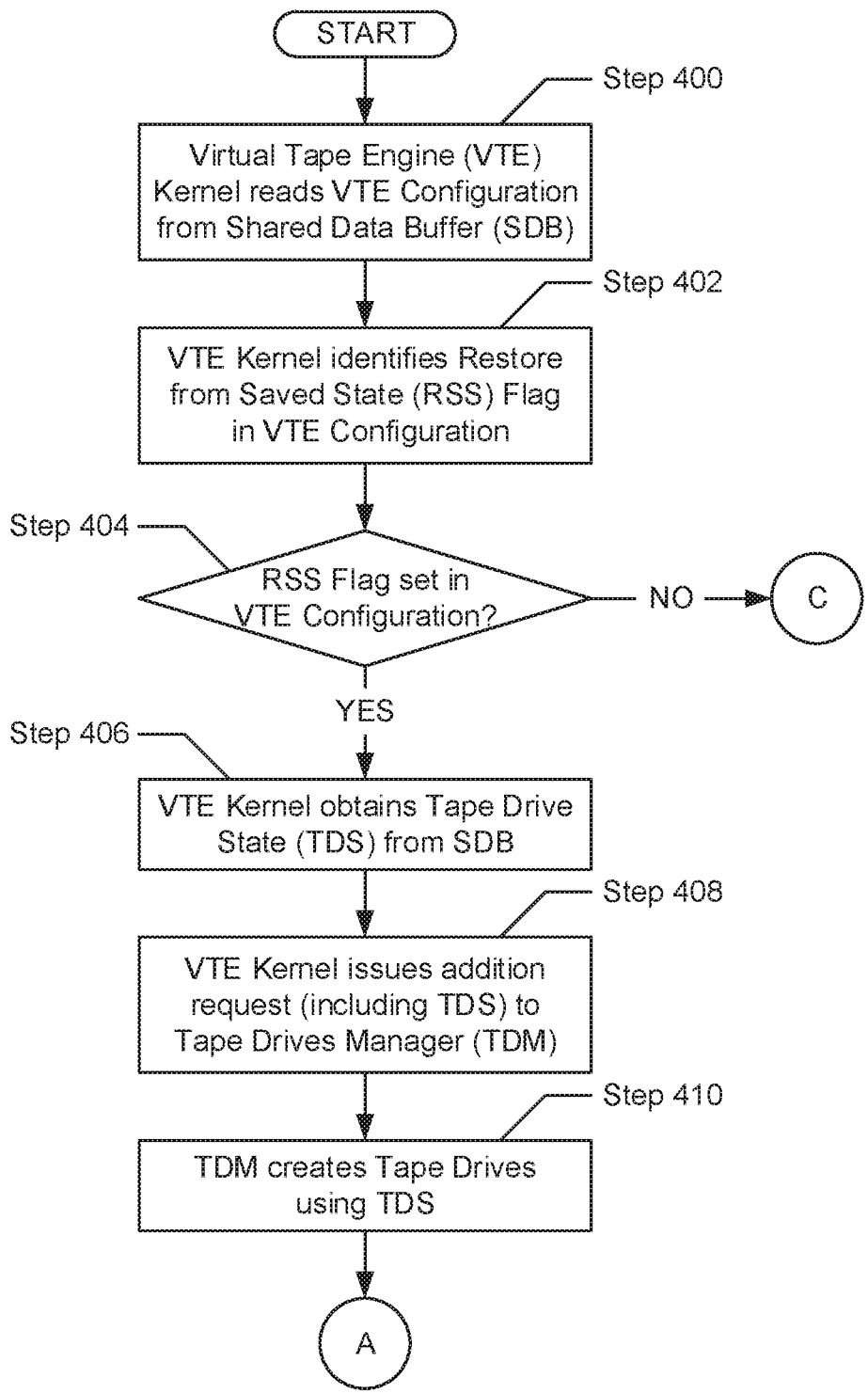
FIGS. 4A-4D show flowcharts describing a method for configuring a virtual tape engine after undergoing a restart in accordance with one or more embodiments of the invention.

Turning to FIG. 4A, in Step 400, following the restart of a virtual tape engine (VTE), the VTE kernel executing on the VTE accesses the shared data buffer (SDB) also residing thereon. Specifically, in one embodiment of the invention, the VTE kernel accesses the SDB to read/obtain the VTE configuration (see e.g., FIG. 2) stored therein.

In Step 402, the VTE kernel examines the VTE configuration (obtained in Step 400) to identify the restore from saved state (RSS) flag specified therein. In one embodiment of the invention, the RSS flag may be a predefined data object (e.g., a bit or bit sequence) used to indicate, after restarting, whether the emulated tape drive(s) on the VTE should assume an initial state defined in the VTE configuration or, alternatively, assume a previous state (i.e., the tape drive state (TDS)) stored prior to the restarting (see e.g., FIG. 3B, Step 326).

In Step 404, a determination is made by the VTE kernel as to whether the RSS flag (identified in Step 402) specified in the VTE configuration (obtained in Step 400) is set/enabled. If it is determined that the RSS flag is set or enabled, then the tape drive(s) are to assume a previously saved state, and thus, the process proceeds to Step 406. On the other hand, if it is alternatively determined that the RSS flag is clear or disabled, then the tape drive(s) are to assume an initial state defined in the VTE configuration, and thus, the process proceeds to Step 460 (see e.g., FIG. 4D).

In Step 406, after determining (in Step 404) that the RSS flag is set/enabled, the VTE kernel initiates the process for restoring the previously saved state for each previously active tape drive. Specifically, in one embodiment of the invention, the VTE kernel may begin by accessing the SDB to retrieve the TDS stored therein. The TDS may represent the current or most recent set of parameters defining the state for each tape drive at the time of detachment (just prior to the restarting of the VTE).

In Step 408, the VTE kernel issues an addition request to the tape drive manager (TDM) also executing on the VTE. In one embodiment of the invention, the addition request may pertain to the creating or adding of one or more tape drives (i.e., the set of tape drives that had been active prior to the restarting of the VTE). Subsequently, the addition request may include the TDS for each previously active tape drive (retrieved from the SDB in Step 406).

In Step 410, based on the addition request, the TDM creates a set of one or more tape drives—the cardinality of which equals the number of tape drives that were active prior to the restarting of the VTE. Further, in one embodiment of the invention, the TDM may use the TDS for one of the previously active tape drives to configure each created tape drive. In using a respective TDS to configure each created tape drive, when activated, the created tape drive may resume operations from the given time their previously active tape drive counterpart had been detached prior to the restarting of the VTE. Further, in having each created tape drive resume the operations of their previously active tape drive counterpart, the restarting of the VTE would seem transparent (i.e., appear to have not taken place) to the mainframe.

Figure 4B:
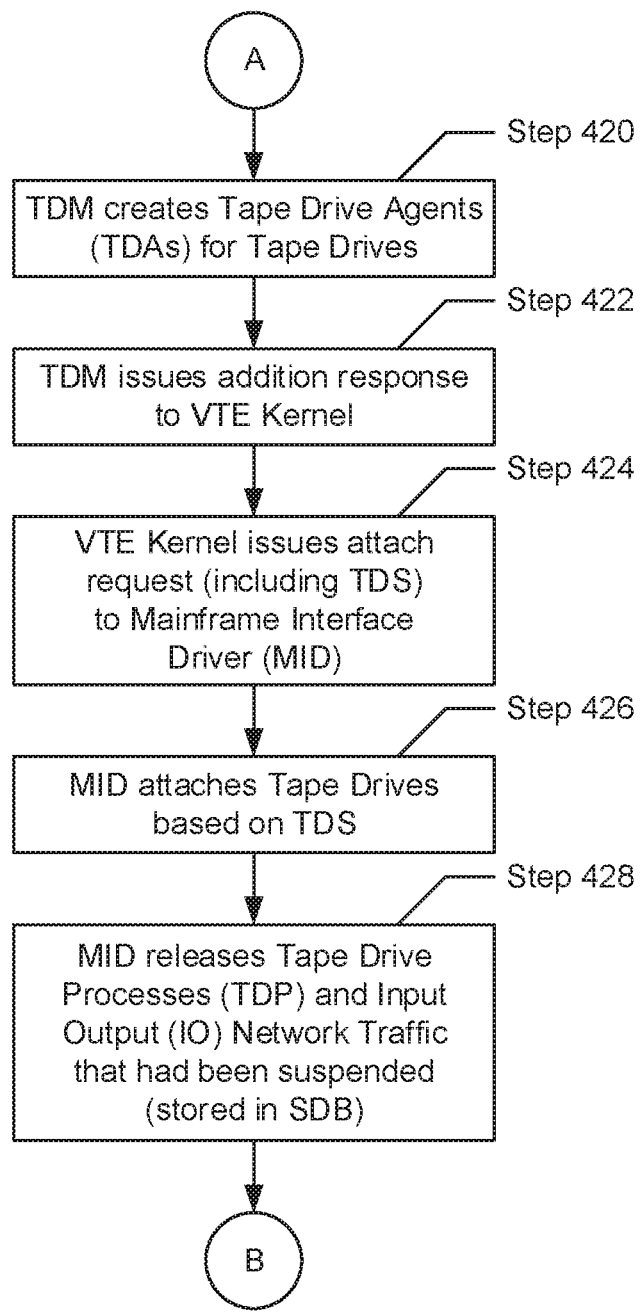

Turning to FIG. 4B, in Step 420, following the creation of the tape drive(s) per the addition request (issued in Step 408), the TDM proceeds to create a set of one or more tape drive agents (TDAs). Specifically, in one embodiment of the invention, the TDM creates one TDA for each tape drive that was created (in Step 410). Creation of each TDA may entail instantiation of a computer process, or computer program instance, to reside and execute within the VTE, where the TDA may be provided at least a portion of the TDS respective to one of the newly created tape drives. The at least portion of the TDS may ensure that the TDA properly manages their respective created tape drive.

In Step 422, the TDM issues an addition response to the VTE kernel. In one embodiment of the invention, the addition response may indicate that the creation/addition of the set of previously active tape drives (per the request issued in Step 408) was successful. In Step 424, based on the addition response, the VTE kernel issues an attach request to the MID. In one embodiment of the invention, the attach request may include instructions directing the MID to re-establish connectivity between the one or more tape drives (created in Step 410) and the one or more mainframe interfaces. The attach request may further include at least a portion of the TDS associated with each created tape drive. The at least portion of the TDS provided may include, but is not limited to, the mount point or directory to which each of the previously active tape drives were logically attached, and thus accessible through, within the VTE filesystem.

In Step 426, in response to the attach request (issued in Step 424), the MID attaches the set of created tape drives to itself, and subsequently, the mainframe interface(s). In one embodiment of the invention, the attachment process may further entail re-mounting each created tape drive to the mount point or directory once associated with a respective previously active tape drive. In remounting each created tape drive to the same mount point/directory as their previously active tape drive counterpart, the restarting of the VTE would seem transparent (i.e., appear to have not taken place) to the mainframe.

In Step 428, after attaching the set of created tape drives, the MID then releases the TDPs and the I/O network traffic from suspension. Specifically, in one embodiment of the invention, the MID may first retrieve the TDPs stored in the SDB, and subsequently, restore each of the one or more computer processes that had been supporting the tape drives prior to the restarting of the VTE. Next, the MID may retrieve the I/O network traffic also stored in the SDB, and re-populate the incoming and outgoing packet buffers residing on the mainframe interfaces, respectively. In unsuspending the TDPs and the I/O network traffic, the restarting of the VTE would seem transparent (i.e., appear to have not taken place) to the mainframe.

Figure 4C:
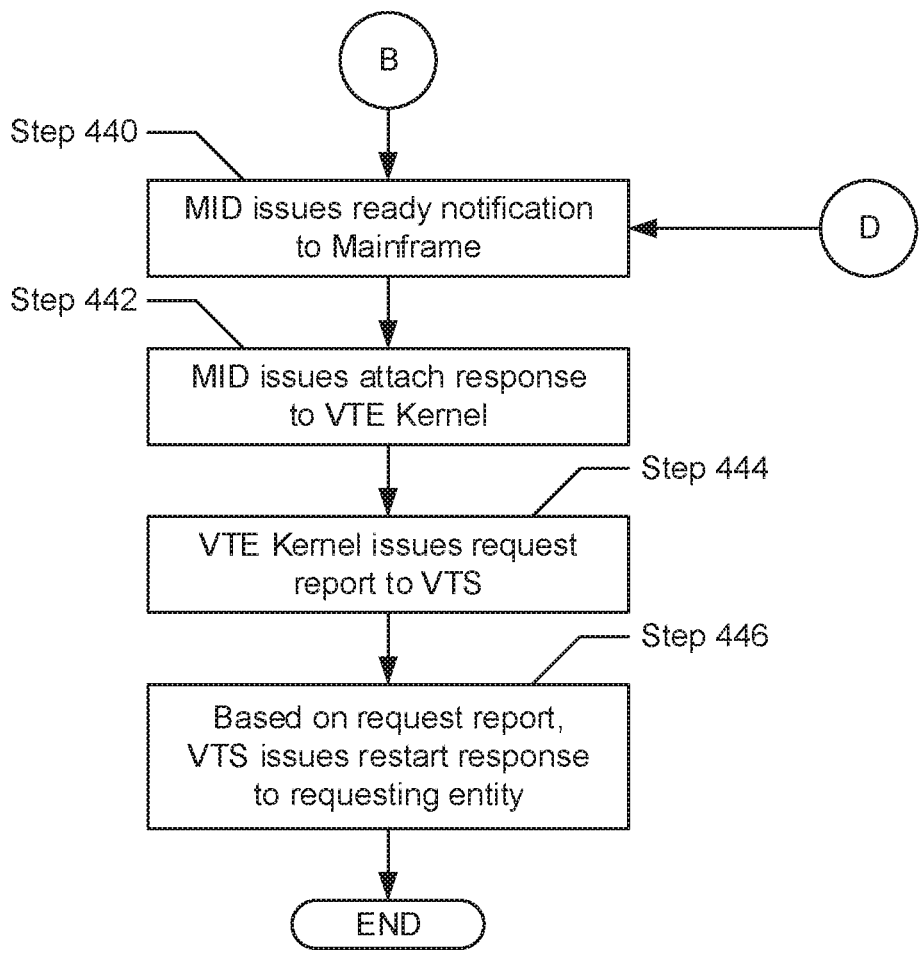

Turning to FIG. 4C, in Step 440, after releasing the TDPs and the I/O network traffic (in Step 428) or, alternatively, after connecting the tape drives (in Step 472) (described below), the MID then issues a ready notification to the mainframe (with which the MID, and thus, the mainframe interface(s), may be operatively connected). In one embodiment of the invention, the ready notification may be a message informing the mainframe that the VTE is no longer busy, and thus, ready to receive further tape drive write and/or read requests. In one embodiment of the invention, the ready notification may be a feature provided in the FICON protocol specification.

In Step 442, following the issuance of the ready notification, the MID issues an attach response to the VTE kernel. In one embodiment of the invention, the attach response may indicate that the re-attachment of the created tape drives (per the request issued in Step 424) was successful. Based on the attach response, in Step 444, the VTE kernel issues a request report to the VTS, or more specifically, to the VTS API. In one embodiment of the invention, the request report may indicate that the transparent restart of the VTE (i.e., transparent to the mainframe) (per the restart request delegated in Step 304, FIG. 3A) was successful. Finally, in Step 446, based on the request report received from each VTE (identified in Step 302), the VTS issues a restart response to the requesting entity that had submitted the restart request to the VTS in Step 300. In one embodiment of the invention, the restart response may indicate that transparent restart of one or more VTEs of the VTS was successful.

Figure 4D:
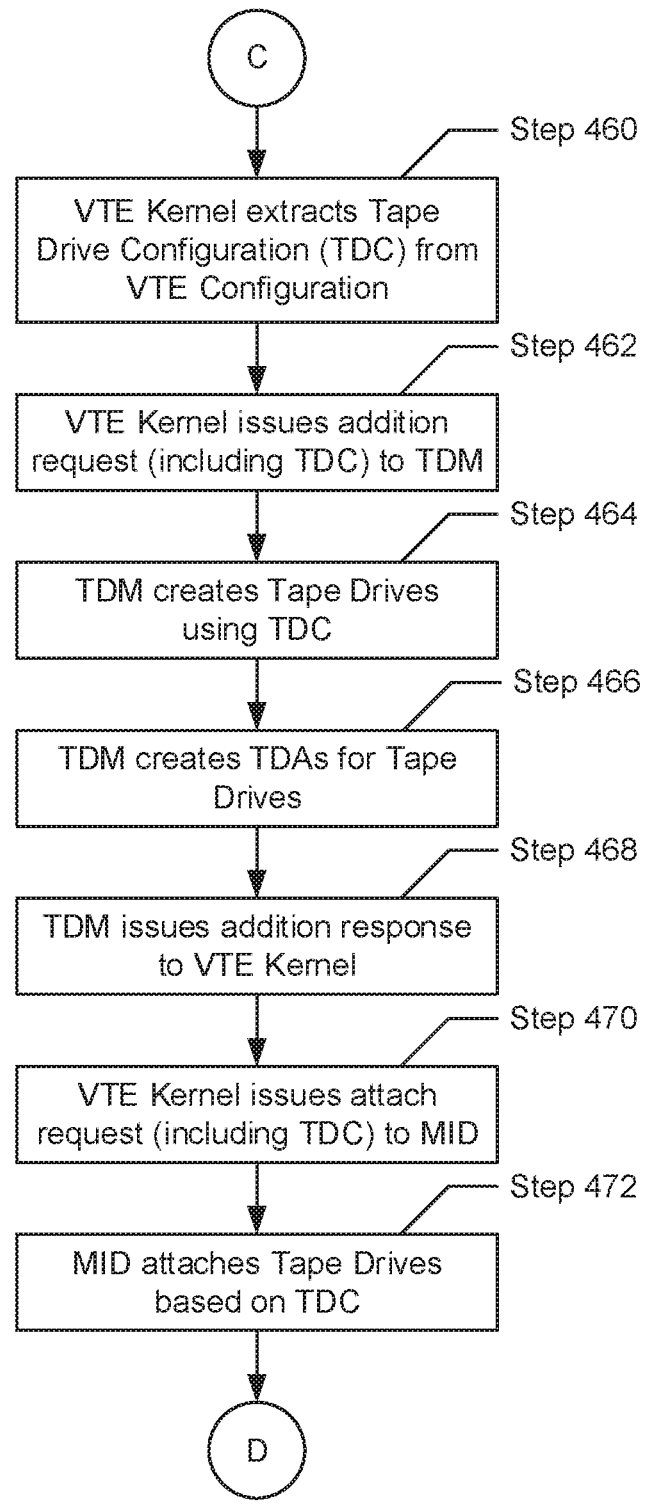

Turning to FIG. 4D, in Step 460, after determining (in Step 404) that the RSS flag is clear/disabled, the VTE kernel initiates the process for installing a new VTE configuration. Specifically, in one embodiment of the invention, the VTE kernel may begin by accessing the SDB to retrieve the VTE configuration stored therein. The VTE configuration may represent a new initial state with winch to configure the restarted VTE. Further, the VTE configuration may include one or more new tape drive configurations (TDCs) (described above) representative of new initial states with which to configure each of one or more new tape drives to be created, which the VTE kernel subsequently extracts from the VTE configuration.

In Step 462, the VTE kernel issues an addition request to the tape drive manager (TDM). In one embodiment of the invention, the addition request may pertain to the creating or adding of one or more new tape drives. Subsequently, the addition request may include the TDC (retrieved in Step 460) for each new tape drive to be created. Each TDC may include, but is not limited to including: (i) a tape library ID associated with a virtual tape library to which the new tape drive would point (i.e., accesses); (ii) a media access control (MAC) address and/or Internet Protocol (IP) address assigned to the new tape drive; (iii) drive type information detailing the specifications for the physical tape drive model the tape drive is to be emulating; (iv) a set of parameters defining the behavior of the tape drive; and (v) a mount point or directory within the VTE filesystem to which the tape drive may logically attach.

In Step 464, based on the addition request, the IDM creates a set of one or more new tape drives. Further, in one embodiment of the invention, the TDM may use one TDC for configuring each new tape drive. In Step 466, following the creation of the new tape drive(s), the TDM proceeds to create a set of one or more new tape drive agents (TDAs). Specifically, in one embodiment of the invention, the TDM creates one new TDA for each new tape drive (created in Step 464). Creation of each new TDA may entail instantiation of a computer process, or computer program instance, to reside and execute within the VTE, where the new TDA may be provided at least a portion of the TDC respective to one of the new tape drives. The at least portion of the TDC may ensure that the new TDA properly manages their respective new tape drive.

In Step 468, the TDM issues an addition response to the VTE kernel. In one embodiment of the invention, the addition response may indicate that the creation/addition of the set of new tape drives (per the request issued in Step 462) was successful. In Step 470, based on the addition response, the VTE kernel issues an attach request to the MID. In one embodiment of the invention, the attach request may include instructions directing the MID to establish connectivity between the one or more new tape drives (created in Step 464) and the one or more mainframe interfaces, thereby also establishing connectivity between the new tape drive(s) and the mainframe. The attach request may further include at least a portion of the TDC associated with each new tape drive. The at least portion of the TDC provided may include, but is not limited to, (i) the MAC and/or IP addresses assigned to each respective new tape drive, and (ii) the mount point or directory within the VTE filesystem to which the new tape drive may logically attach.

In Step 472, in response to the attach request (issued in Step 470), the MID attaches the set of new tape drives to itself, and subsequently, the mainframe interface(s). In one embodiment of the invention, the attachment process may further entail mounting each new tape drive to the mount point or directory within the VTE filesystem specified in the TDC. Following the attachment of the new tape drives, the process proceeds to Step 440 (see e.g., FIG. 4C).

Figure 5:
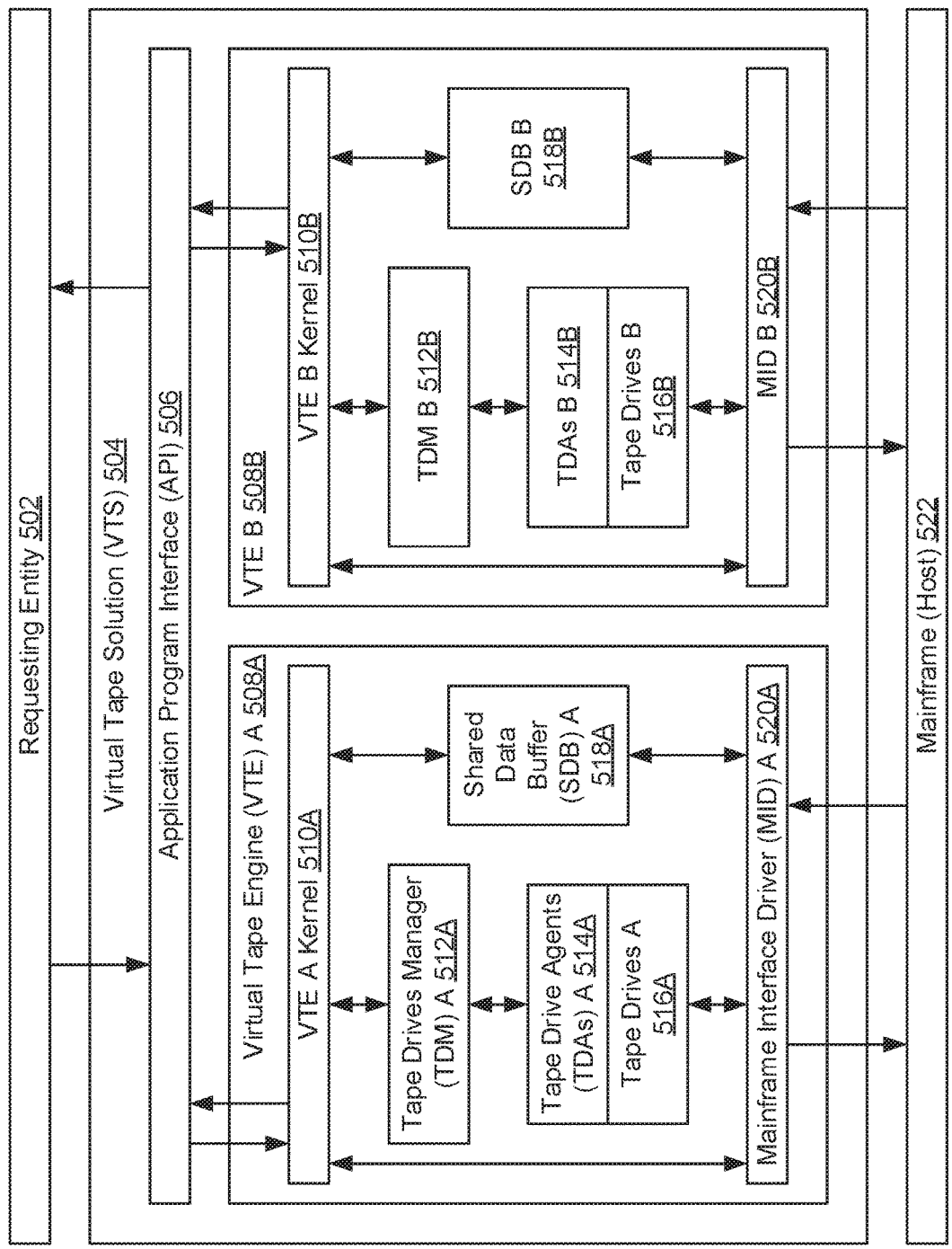
FIG. 5 shows an example system in accordance with one or more embodiments of the invention.

FIG. 5 shows an example system in accordance with one or more embodiments of the invention. The following example, presented in conjunction with components shown in FIG. 5, is for explanatory purposes only and not intended to limit the scope of the invention.

Turning to FIG. 5, the example system (500) includes a requesting entity (502), a VTS (504), and a mainframe (522). The VTS (504) includes an API (506) to which the requesting entity is operatively connected, and two VTEs (508A, 508B). Further, each of the two VTEs (508A, 508B) includes a VTE kernel (510A, 510B), a TDM (512A, 512B), a set of TDAs (514A, 514B), a set of tape drives (516A, 516B), a SDB (518A, 518B), and a MID (520A, 520B). Moreover, each of the MIDs (520A, 520B) is operatively connected to the mainframe (522) through a respective mainframe interface (not shown) residing on each VTE (508A, 508B).

Turning to the example, consider a scenario whereby the requesting entity (502) submits a restart request to the VTS (504). Accordingly, the restart request is received by the VTS API (506) and includes a VTE ID—e.g., "vteA"—and a corresponding VTE configuration. Upon receiving the restart request, the VTS API (506) identifies VTE A (508A) (i.e., the appropriate VTE of the two VTEs (508A, 508B) forming the VTS (504)) as the VTE associated with the received VTE ID. After identifying VTE A (508A), the VTS API (506) delegates a reduced form of the restart request (i.e., without the VTE ID) to the VTE A kernel (510A) executing on VTE A (508A).

Subsequently, upon receiving the reduced restart request from the VTS API (506), the VTE A kernel (510A) extracts the VTE configuration enclosed therein and stores the VTE configuration in the local SDB (518A). Thereafter, based on the restart request, the VTS API (506) issues a detach request to the MID (520A). The detach request commands the MID (520A) to unmount all active tape drives (516A) from the VTE (508A). In response to receiving the detach request, the MID (520A) first issues a busy notification to the mainframe (522) through the mainframe interface (not shown). The busy notification serves to forewarn the mainframe (522) that the VTE (508A) is busy, and accordingly, requests that the mainframe (522) suspends the submission of any future I/O requests. After confirming receipt of the busy notification from the mainframe (522), the MID (520A) then suspends all TDPs (not shown) executing on the VTE (508A), which support all active tape drives (516A). The MID (520A) further suspends the I/O network traffic (not shown) relevant to all active tape drives (516A) that are awaiting transmission or processing in packet buffers located on the mainframe interface. The MID (520A) suspends both the aforementioned TDPs and the I/O network traffic by preserving their data, metadata, and/or activities within the SDB (518A). Afterwards, the MID (520A) may generate a snapshot of each active tape drive (516A), thereby obtaining the current parameters and data defining the current configuration (i.e., TDS (not shown)) for each active tape drive (516A). The MID (520A) subsequently detaches the active tape drives (516A) by unmounting them from one or more directories within the VTE filesystem (not shown). Lastly, the MID (520A) issues a detach response to the VTE A kernel (510A) that includes the TDSs for all active tape drives (516A) obtained earlier.

Upon receiving the detach response from the MID (520A), the VTE A kernel (510A) extracts the TDSs included therein, and preserves them in the SDB (518A). After preserving the TDSs, the VTE A kernel (510A) then proceeds to restart the VTE (508A). Later, once the VTE (508A) re-activates after restart, the VTE A kernel (510A) accesses the SDB (518A) to retrieve the VTE configuration stored therein. The VTE A kernel (510A) then examines the VTE, configuration to identify the RSS flag specified therein. For the purposes of this example, assume the RSS flag is set or enabled. Accordingly, through the examination, the VTE A kernel (510A) determines that the RSS flag is set/enabled. Based on this determination, the VTE A kernel (510A) concludes that the restarted VTE (508A) is to be configured using the earlier preserved state. To effect this conclusion, the VTE A kernel (510A) first re-accesses the SDB (518A) to retrieve the TDSs (preserving the pre-restart configuration and data associated with each previously active tape drive (516A)). Next, the VTE A kernel (510A) issues an addition request to the TDM (512A) to re-create/add the previously active tape drives (516A). The addition request includes the TDS for each previously active tape drive (516A).

In receiving the addition request, the TDM (512A) proceeds to re-create the previously active tape drives (516A) using the obtained TDSs submitted through the addition request. In integrating their pre-restart configurations and data, each previously active tape drive (516A) behaves and resumes operations at the specified time just prior to their detachment earlier. This resuming of previous behavior and activities, in part, enables the transparency of the restart to the mainframe. After creating the previously active tape drives (516A), the TDM (512A) then re-creates the previously active TDAs (514A), which had been responsible for the previously active tape drives (516A). To create each previously active TDA (514A), the TDM (512A) uses at least a portion of the TDS associated with the previously active tape drive (516A) for which the previously active TDA (514A) was/is responsible. After re-creating the TDAs (514A), the TDM (512A) issues an addition response back to the VTE A kernel (510A) indicating that the re-creation of the previously active tape drives (516A) was successful.

Thereafter, based on the addition response, the VTE A kernel (510A) issues an attach request, which may include the TDSs, to the MID (520A). The attach request may command the MID (520A) to re-attach the previously, and now, the currently, active tape drives (516A). Towards re-attaching the active tape drives (516A), the MID (520A) re-mounts the active tape drives (516A) to the one or more directories within the VTE filesystem to which the active tape drives (516A), prior to the restart, had been mounted. The mounting information for each active tape drive (516A) may be specified as a portion of the TDS associated with that active tape drive (516A). Re-attaching the active tape drives (516A) may also entail re-establishing the connection between each active tape drive (516A) and the mainframe interface. After re-attaching the active tape drives (516A), the MID (520A) then releases or unsuspends the TDPs and the I/O network traffic preserved in the SDB (518A). To unsuspend the TDPs, the MID (520A) re-instantiates all the previously active computer processes (i.e., TDPs) and their activities that were supporting the tape drives (516A) prior to the restart. Like the active tape drives (516A), upon re-instantiation using their pre-restart state, the aforementioned computer processes would behave and resume operations at a specified time when the TDPs had been preserved before restart. This resuming of previous behavior and activities, in part, further enables the transparency of the restart to the mainframe.

Furthermore, to unsuspend the I/O network traffic, the MID (520A) re-populates the packet buffers, located on the mainframe interface, with the incoming and outgoing network packets, respectively, that had been preserved prior to the restart. Restoration of the pre-restart state of the packet buffers additionally enables the transparency of the restart to the mainframe. After unsuspending the TDPs and the I/O network traffic, the MID (520A) subsequently issues a ready notification to the mainframe (522) through the mainframe interface. The ready notification serves to inform the mainframe (522) that the VTE (508A) is no longer busy, and accordingly, requests that the mainframe (522) resumes the submission of any future I/O requests. After confirming receipt of the ready notification from the mainframe (522), the MID (520A) issues an attach response to the VTE A kernel (510A). The attach response may indicate that the re-attachment of the active tape drives (516A) was successful.

Based on the attach response from the MID (520A), the VTE A kernel (510A) issues a request report to the VTS API (506). The request report may indicate that the VTE (508A) restarted and was configured successfully. Further, based on the received request report, the VTS API (506) issues a restart response back the requesting entity (502) indicating the restart of VTE A (508A) per the submitted restart request was successful.

Figure 6:
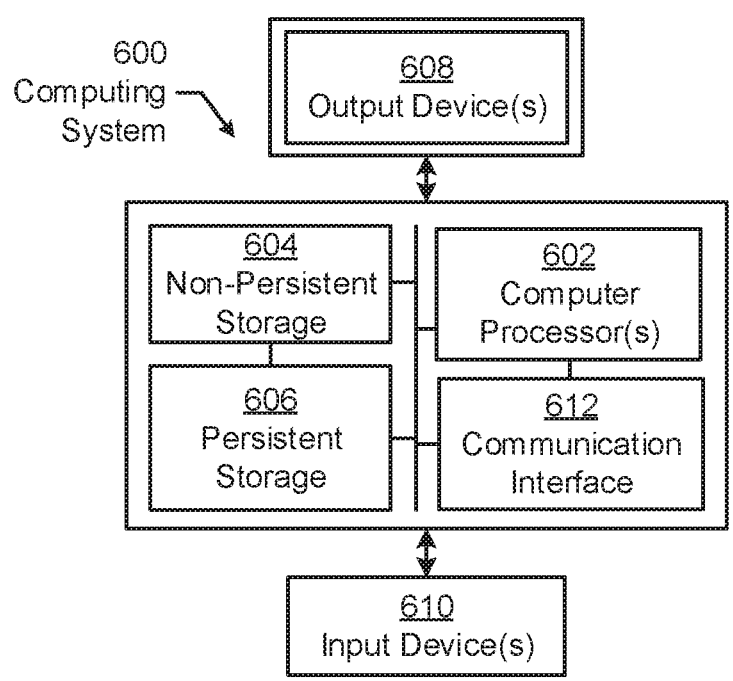
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processors) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and Output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention provide a mechanism for the non-disruptive restarting of virtual tape engines (VTEs). The restarting of a VTE non-disruptively refers to the performing of the restart so that, to a mainframe connected to the VTE, the restart is transparent (or appears to not have transpired). Advantages introduced by one or more embodiments of the invention include: (i) the ability to perform VTE upgrades outside of mainframe maintenance windows through the suspension, rather than the disruption, of mainframe/host operations; (ii) the ability to perform VTE reconfigurations without disrupting unrelated host operations—e.g., the reconfiguration of one or more tape drives to access other tape libraries without disrupting host operations on other tape drives; and (iii) enabling tape library migration for one or more tape drives—by, e.g., (a) setting up replication between tape libraries prior to the migration so that all data is available at a new location; (b) suspending all tape drive operations; (c) changing tape drive definitions to access the new tape library; and (d) restoring tape drive emulation to a prior state before the migration, thus enabling migration between storages.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for restarting virtual tape engines (VTEs), comprising:
   receiving a restart request comprising a VTE configuration for a VTE; and
   processing the restart request to restart the VTE by:
      storing the VTE configuration in a shared data buffer (SDB) residing on the VTE;
      detaching a set of virtual tape drives from the VTE;
      preserving a tape drive state (TDS), a set of tape drive processes (TDPs), and input/output (I/O) network traffic associated with each virtual tape drive of the set of virtual tape drives, in the SDB; and
      after the preserving, restarting the VTE.

2. The method of claim 1, wherein detaching the set of virtual tape drives from the VTE comprises:
   issuing a busy notification to a mainframe operatively connected to the VTE;

after confirming reception of the busy notification from the mainframe, for each virtual tape drive of the set of virtual tape drives on the VTE:
severing a connection between the virtual tape drive and a mainframe interface operatively connected to the mainframe;
suspending the set of TDPs supporting the virtual tape drive;
suspending a set of outgoing network packets of the I/O network traffic associated with the virtual tape drive, wherein the set of outgoing network packets is awaiting transmission to the mainframe;
suspending a set of incoming network packets of the I/O network traffic associated with the virtual tape drive, wherein the set of incoming network packets is awaiting processing by the VTE;
obtaining the TDS comprising a current state of the virtual tape drive; and
unmounting the virtual tape drive from a directory within a VTE filesystem residing on the VTE.

3. The method of claim 1, further comprising:
following a re-activation of the VTE after the restarting:
obtaining the VTE configuration from the SDB;
reading the VTE configuration to identify a restore from saved state (RSS) flag specified therein;
determining that the RSS flag is enabled; and
based on the determining, configuring the VTE using a preserved state.

4. The method of claim 3, wherein configuring the VTE using the preserved state comprises:
for each virtual tape drive of the set of virtual tape drives:
obtaining the TDS for the virtual tape drive from the SDB;
re-creating the virtual tape drive using the TDS; and
re-creating a tape drive agent (TDA) responsible for the virtual tape drive, and
after re-creating each virtual tape drive and each TDA:
re-attaching the set of virtual tape drives to the VTE, wherein restoring the preserved state comprises at least the re-creating and the re-attaching.

5. The method of claim 4, wherein re-attaching the set of virtual tape drives to the VTE comprises:
for each virtual tape drive of the set of virtual tape drives:
re-establishing a connection between the virtual tape drive and a mainframe interface operatively connected to a mainframe;
unsuspending the set of TDPs supporting the virtual tape drive;
unsuspending a set of outgoing network packets of the I/O network traffic associated with the virtual tape drive, wherein the set of outgoing network packets is awaiting transmission to the mainframe;
unsuspending a set of incoming network packets of the I/O network traffic associated with the virtual tape drive, wherein the set of incoming network packets is awaiting processing by the VTE; and
re-mounting the virtual tape drive to a directory within a VTE filesystem residing on the VTE, and
after re-mounting each virtual tape drive of the set of virtual tape drives:
issuing a ready notification to the mainframe through the mainframe interface.

6. The method of claim 1, further comprising:
following a re-activation of the VTE after the restarting:
obtaining the VTE configuration from the SDB;
reading the VTE configuration to identify a restore from saved state (RSS) flag specified therein;
determining that the RSS flag is disabled; and
based on the determining, configuring the VTE using an initial state.

7. The method of claim 6, wherein configuring the VTE using the initial state comprises:
for each new virtual tape drive of a set of new virtual tape drives specified in the VTE configuration:
extracting a tape drive configuration (TDC) for the new virtual tape drive from the VTE configuration;
creating the new virtual tape drive using the TDC; and
creating a new tape drive agent (TDA) responsible for the new virtual tape drive, and
after creating each new virtual ape drive and each new TDA:
attaching the set of new virtual tape drives to the VTE, wherein setting the initial state comprises at least the creating.

8. The method of claim 7, wherein attaching the set of new virtual tape drives to the VTE comprises:
for each new virtual tape drive of the set of new virtual tape drives:
establishing a connection between the new virtual tape drive and a mainframe interface operatively connected to a mainframe; and
mounting the new virtual tape drive to a directory within a VTE filesystem residing on the VTE, and
after mounting each new virtual tape drive of the set of new virtual tape drives:
issuing a ready notification to the mainframe through the mainframe interface.

9. A system, comprising:
a requesting entity; and
a virtual tape solution (VTS) operatively connected to the requesting entity, and programmed to:
receive, from the requesting entity, a restart request comprising a set of virtual tape engine (VTE) IDs and a set of VTE configurations; and
process the restart request to restart a set of VTEs by:
for each VTE of the set of VTEs:
identifying the VTE using a VTE ID of the set of VTE IDs, and
delegating, to the VTE, a VTE configuration of the set of VTE configurations.

10. The system of claim 9, wherein each VTE of the set of VTEs is a server forming the VTS.

11. The system of claim 9, wherein each VTE of the set of VTEs comprises:
a mainframe interface;
a set of virtual tape drives operatively connected to the mainframe interface;
a set of tape drive agents (TDAs) responsible for the set of virtual tape drives;
a tape drives manager (TDM) responsible for the set of TDAs;
a mainframe interface driver (MID) managing communications between the mainframe interface and the set of virtual tape drives;
a VTE kernel overseeing at least the TDM and the MID; and
a shared data buffer (SDB) for storing at least the VTE configuration.

12. The system of claim 9, further comprising:
a mainframe operatively connected to each VTE of the set of VTEs.

13. A non-transitory computer readable medium (CRM) comprising computer readable program code, which when executed by a computer processor, enables the computer processor to:
  receive a restart request comprising a VTE configuration for a VTE; and
  process the restart request to restart the VTE by:
    storing the VTE configuration in a shared data buffer (SDB) residing on the VTE;
    detaching a set of virtual tape drives from the VTE;
    preserving a tape drive state (TDS), a set of tape drive processes (TDPs), and input/output (I/O) network traffic associated with each virtual tape drive of the set of virtual tape drives, in the SDB; and
    after the preserving, restarting the VTE.

14. The non-transitory GRIM of claim 13, wherein to detach the set of virtual tape drives from the VTE, the computer readable program code, which when executed by the computer processor, enables the computer processor to:
  issue a busy notification to a mainframe operatively connected to the VTE;
  after confirming reception of the busy notification from the mainframe, for each virtual tape drive of the set of virtual tape drives on the VTE:
    sever a connection between the virtual tape drive and a mainframe interface operatively connected to the mainframe;
    suspend the set of TDPs supporting the virtual tape drive;
    suspend a set of outgoing network packets of the I/O network traffic associated with the virtual tape drive, wherein the set of outgoing network packets is awaiting transmission to the mainframe;
    suspend a set of incoming network packets of the I/O network traffic associated with the virtual tape drive, wherein the set of incoming network packets is awaiting processing by the VTE;
    obtain the TDS comprising a current state of the virtual tape drive; and
    unmount the virtual tape drive from a directory within a VTE filesystem residing on the VTE.

15. The non-transitory CRM of claim 13, further comprising computer readable program code, which when executed by the computer processor, enables the computer processor to:
  following a re-activation of the VTE after the restarting:
    obtain the VTE configuration from the SDB;
    read the VTE configuration to identify a restore from saved state (RSS) flag specified therein;
    determine that the RSS flag is enabled; and
    based on the determining, configure the VTE using a preserved state.

16. The non-transitory CRM of claim 15, wherein to configure the VTE using the preserved state, the computer readable program code, which when executed by the computer processor, enables the computer processor to:
  for each virtual tape drive of the set of virtual tape drives:
    obtain the TDS for the virtual tape drive from the SDB;
    re-create the virtual tape drive using the TDS; and
    re-create a tape drive agent (TDA) responsible for the virtual tape drive, and
  after re-creating each virtual tape drive and each TDA:
    re-attach the set of virtual tape drives to the VTE, wherein restoring the preserved state comprises at least the re-creating and the re-attaching.

17. The non-transitory CRM of claim 16, wherein to re-attach the set of virtual tape drives to the VTE, the computer readable program code, which when executed by the computer processor, enables the computer processor to:
  for each virtual tape drive of the set of virtual tape drives:
    re-establish a connection between the virtual tape drive and a mainframe interface operatively connected to a mainframe;
    unsuspend the set of TDPs supporting the virtual tape drive;
    unsuspend a set of outgoing network packets of the I/O network traffic associated with the virtual tape drive, wherein the set of outgoing network packets is awaiting transmission to the mainframe;
    unsuspend a set of incoming network packets of the I/O network traffic associated with the virtual tape drive, wherein the set of incoming network packets is awaiting processing by the VTE; and
    re-mount the virtual tape drive to a directory within a VTE filesystem residing on the VTE, and
  after re-mounting each virtual tape drive of the set of virtual tape drives:
    issue a ready notification to the mainframe through the mainframe interface.

18. The non-transitory CRM of claim 13, further comprising computer readable program code, which when executed by the computer processor, enables the computer processor to:
  following a re-activation of the VTE after the restarting:
    obtain the VTE configuration from the SDB;
    read the VTE configuration to identify a restore from saved state (RSS) flag specified therein;
    determine that the RSS flag is disabled; and
    based on the determining, configure the VTE using an initial state.

19. The non-transitory CRM of claim 18, wherein to configure the VTE using the initial state, the computer readable program code, which when executed by the computer processor, enables the computer processor to:
  for each new virtual tape drive of a set of new virtual tape drives specified in the VTE configuration:
    extract a tape drive configuration (TDC) for the new virtual tape drive from the VTE configuration;
    create the new virtual tape drive using the TDC; and
    create a new tape drive agent (TDA) responsible for the new virtual tape drive, and
  after creating each new virtual tape drive and each new TDA:
    attach the set of new virtual tape drives to the VTE, wherein setting the initial state comprises at least the creating.

20. The non-transitory CRM of claim 19, wherein to attach the set of new virtual tape drives to the VTE, the computer readable program code, which when executed by the computer processor, enables the computer processor to:
  for each new virtual tape drive of the set of new virtual tape drives:
    establish a connection between the new virtual tape drive and a mainframe interface operatively connected to a mainframe; and
    mount the new virtual tape drive to a directory within a VTE filesystem residing on the VTE and
  after mounting each new virtual tape drive of the set of new virtual tape drives:
    issue a ready notification to the mainframe through the mainframe interface.

* * * * *

UNITED STATES PATENT AND TRADEMARK OFFICE
CERTIFICATE OF CORRECTION

PATENT NO. : 10,599,446 B2  
APPLICATION NO. : 15/981170  
DATED : March 24, 2020  
INVENTOR(S) : Mikhail Tolsto et al.

Page 1 of 1

It is certified that error appears in the above-identified patent and that said Letters Patent is hereby corrected as shown below:

In the Claims

Column 18, Line 13, in Claim 7, the phrase "virtual ape drive" should read -- virtual tape drive --.
Column 19, Line 16, in Claim 14, the phrase "GRIM of claims" should read -- CRM of claims --.

Signed and Sealed this
Fourteenth Day of July, 2020

Andrei Iancu
*Director of the United States Patent and Trademark Office*